(12) United States Patent
Schwartz

(10) Patent No.: US 10,761,562 B2
(45) Date of Patent: Sep. 1, 2020

(54) ACCESSORY STORAGE SYSTEM FOR COMPUTERS

(71) Applicant: Israel Schwartz, Boca Raton, FL (US)

(72) Inventor: Israel Schwartz, Boca Raton, FL (US)

( * ) Notice: Subject to any disclaimer, the term of this patent is extended or adjusted under 35 U.S.C. 154(b) by 0 days.

(21) Appl. No.: 14/677,940

(22) Filed: Apr. 2, 2015

(65) Prior Publication Data

US 2015/0285433 A1    Oct. 8, 2015

Related U.S. Application Data

(60) Provisional application No. 61/974,874, filed on Apr. 3, 2014.

(51) Int. Cl.
*F16M 11/00* (2006.01)
*G06F 1/16* (2006.01)
*F16B 2/20* (2006.01)

(52) U.S. Cl.
CPC .............. *G06F 1/1607* (2013.01); *F16B 2/20* (2013.01)

(58) Field of Classification Search
CPC ................................ F16B 2/20; F16M 13/022
See application file for complete search history.

(56) References Cited

U.S. PATENT DOCUMENTS

| | | | | |
|---|---|---|---|---|
| 3,325,038 | A * | 6/1967 | Ferney | E04D 13/08 52/11 |
| 3,842,981 | A * | 10/1974 | Lambert | A47G 29/08 211/74 |
| 5,356,105 | A * | 10/1994 | Andrews | B63B 35/14 248/221.11 |
| 6,637,707 | B1 * | 10/2003 | Gates | A47B 81/005 211/64 |
| 6,824,114 | B1 * | 11/2004 | VanSkiver | A01K 1/0114 248/220.21 |
| 7,837,165 | B2 * | 11/2010 | Stone | A47G 7/044 224/414 |
| 10,508,833 | B2 * | 12/2019 | Johansen | F24S 25/61 |
| 2006/0043248 | A1 * | 3/2006 | Robertson | A47F 3/0439 248/311.2 |

* cited by examiner

*Primary Examiner* — Amy J. Sterling
(74) *Attorney, Agent, or Firm* — Allen D Hertz, P.A.; Allen D. Hertz

(57) ABSTRACT

A storage system that is secured to a computer monitor. The system includes a tray that extends across the lower edge of the monitor and includes one or more detachable storage compartments. The storage tray is formed having a front wall, a bottom wall, and a rear wall, collectively forming a U shape. An attachment wall is provided at an upper end of the rear wall for attachment to a computer monitor. The attachment wall can be configured having a horizontal orientation for attachment to a lower surface of the monitor or a vertical orientation for attachment to a rear of the monitor. The interior surfaces of the front wall, the bottom wall, and the rear wall define a storage compartment of the storage tray.

17 Claims, 9 Drawing Sheets

ACCESSORY STORAGE SYSTEM FOR COMPUTERS

CROSS-REFERENCE TO RELATED APPLICATIONS

This application is related to, and claims the benefit of, the provisional patent application entitled "Storage System For Computer Monitors", filed Apr. 3, 2014, bearing U.S. Ser. No. 61/974,874 and naming Israel Schwartz, the named inventor herein, as sole inventor, the contents of which is specifically incorporated by reference herein in its entirety.

BACKGROUND

Technical Field

The present invention relates in general to accessories for computer monitors. In particular, the present invention relates to a storage tray that is attached to a lower edge of a monitor, and includes both an integral storage compartment and one or more removable containers that attach to the storage tray.

Background of the Invention

There is typically a shortage of space in work environments for a variety of items that often clutter the surface of a desk. Often, items are scattered such that they may be difficult to locate when needed. It would be desirable to have a convenient storage area for small items such that they would be easy to locate when needed, while at the same time being kept off of the surface of a desk.

While the prior art has provided basic notice to vehicle drivers of a temporary change in speed limits and other events, it has failed to provide a proactive system that can inexpensively and conveniently notify the driver of the reduced speed limit even if the driver is not paying attention to the signage.

SUMMARY OF THE INVENTION

This invention provides an attachable storage system that is secured to a computer monitor. The system includes a tray that extends across the lower edge of the monitor and one or more detachable storage compartments.

DETAILED DESCRIPTION OF THE PREFERRED EMBODIMENT

Figure 1:
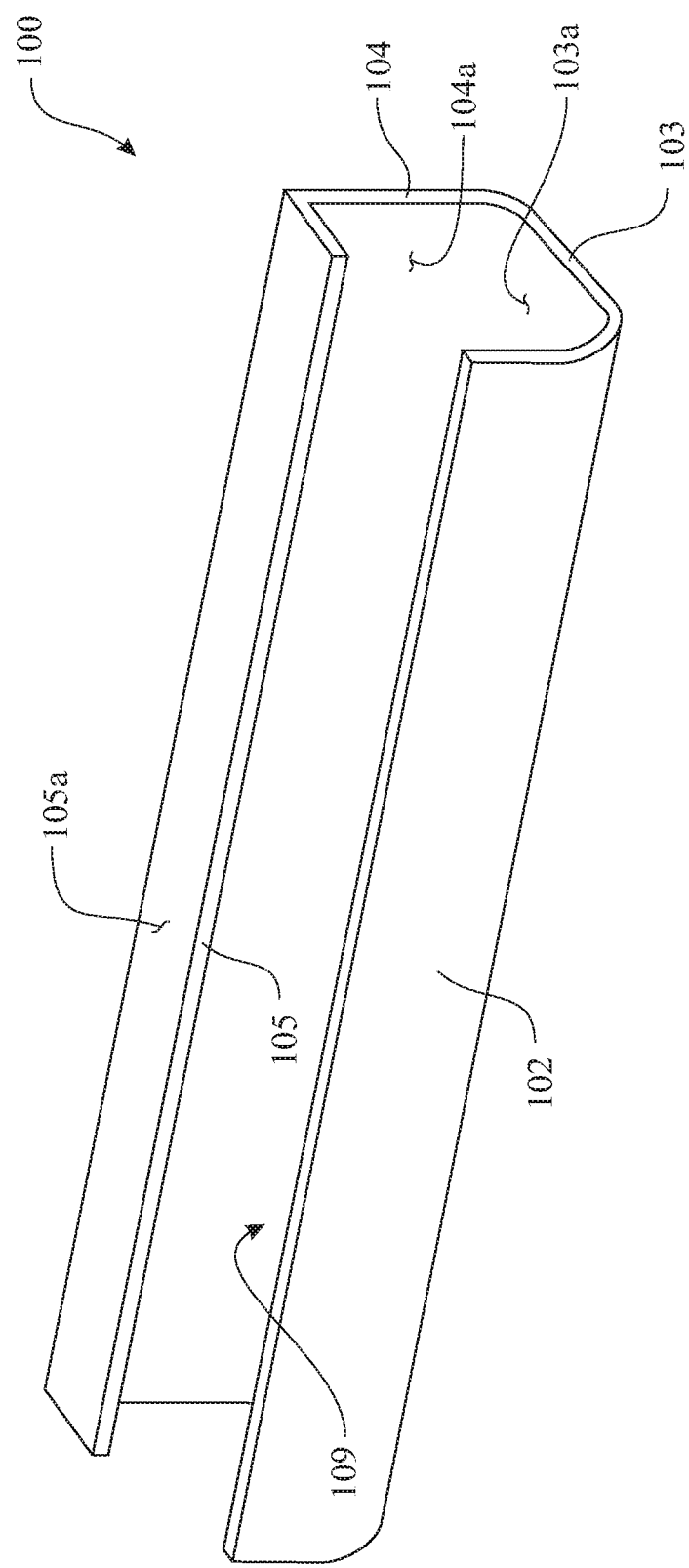
FIG. 1 presents an isometric view of a first embodiment of a storage tray that secures to a monitor.
Figure 3:
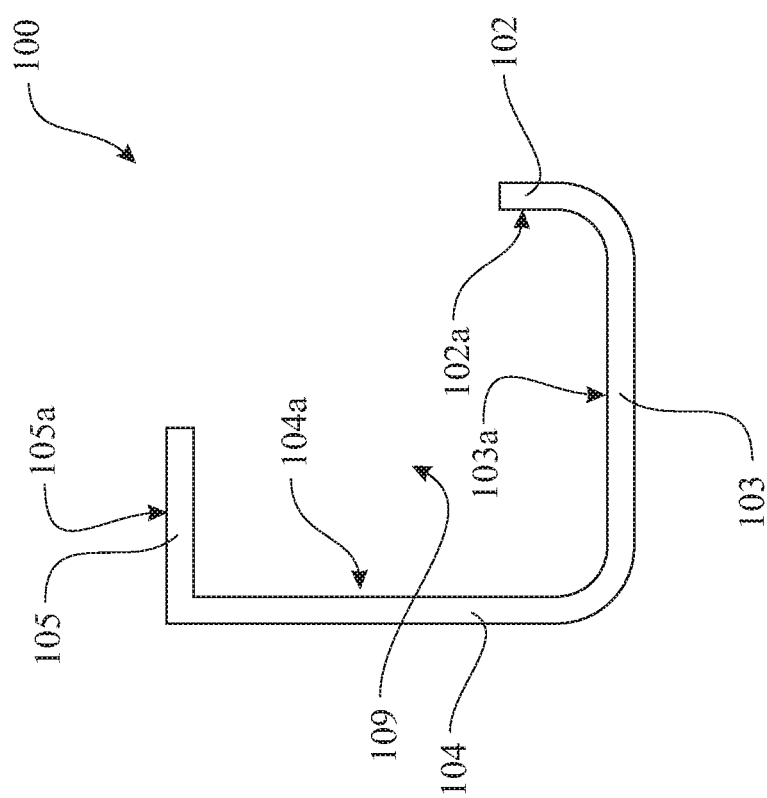
FIG. 3 presents a side elevation view of the storage tray originally introduced in FIG. 1.
Figure 4:
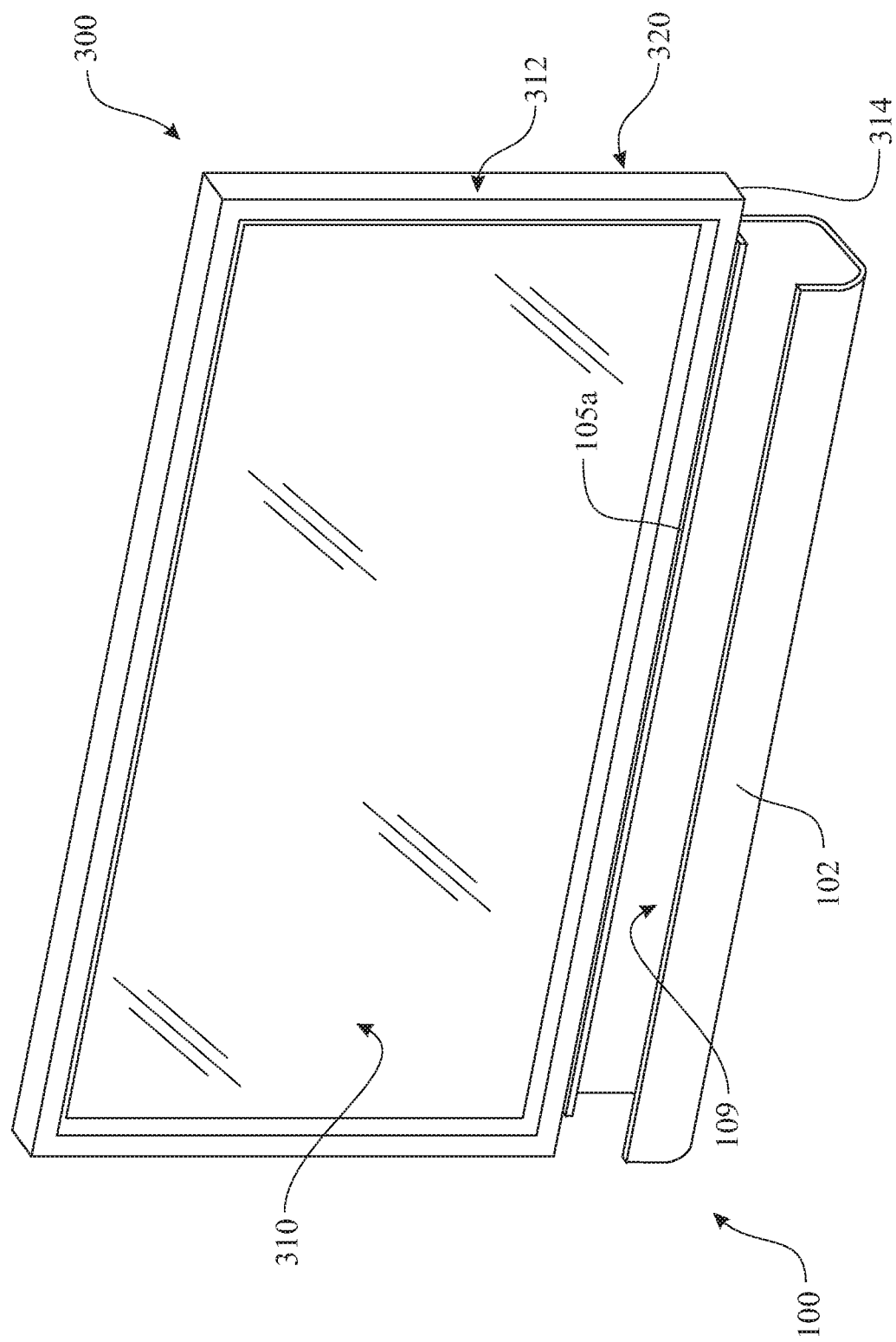
FIG. 4 presents an isometric view of the storage tray originally introduced in FIG. 1, wherein the storage tray is secured to a computer monitor.

FIG. 1 presents an isometric view of a first exemplary storage tray 100, where the storage tray 100 is configured to be secured to a monitor 300 (as shown in FIG. 4). The storage tray 100 includes a front wall 102, a bottom wall 103, a rear wall 104, and an attachment wall 105, where an attachment surface 105a of the attachment wall 105 is secured to the bottom of a monitor via an adhesive, double stick tape, etc. The front wall 102, the bottom wall 103, and the rear wall 104 are formed as a unitary structure having a form of an extruded U shape. The front wall 102 and the bottom wall 103 are contiguous with and transition between one another, and the bottom wall 103 and the rear wall 104 are contiguous with and transition between one another collectively forming the U shape. The storage tray 100 provides a storage compartment 109 for storing articles. The storage compartment 109 is partially defined by a interior surface 103a of the bottom wall 103 and an interior surface 104a of the rear wall 104. Details of the storage compartment are described in FIG. 3. Those skilled in the art will recognize that any suitable method of securing the storage tray 100 to a monitor can be used. The attachment wall 105 extends substantially perpendicular from an upper, free end of the rear wall 104. In the exemplary illustration, the attachment wall 105 cantilevers forward from the upper, free end of the rear wall 104.

The storage tray 100 can be fabricated from any suitable material, and can be formed using any suitable manufacturing process, including extruding, molding, etc.

Figure 2:
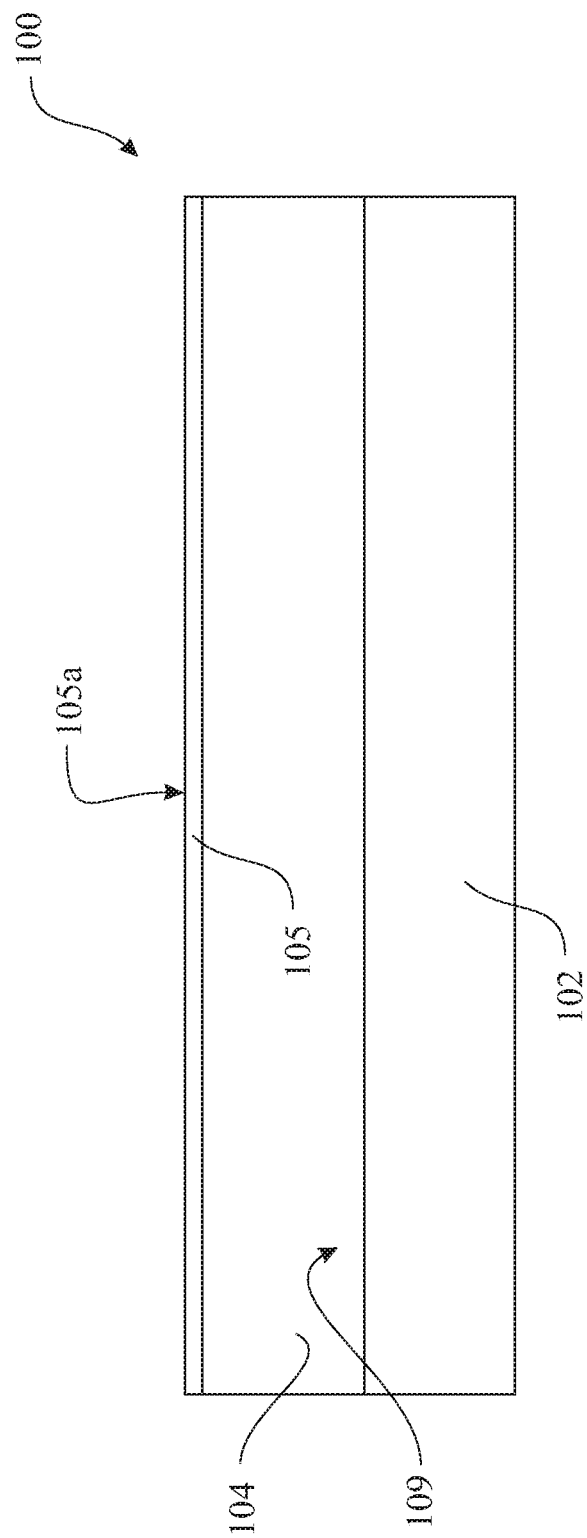
FIG. 2 presents a front view of the storage tray originally introduced in FIG. 1.

FIG. 2 presents a front view of the storage tray 100 originally introduced in FIG. 1; the illustration showing a storage tray 100 that secures to the monitor 300. The figure shows the storage compartment 109, the front wall 102, the rear wall 104, and the attachment surface 105a of the attachment wall 105.

FIG. 3 presents a side edge view of the storage tray 100 originally introduced in FIG. 1; the illustration showing the front wall 102, the bottom wall 103, the rear wall 104, and the attachment wall 105. The illustration best presents the storage compartment 109. The storage compartment 109 is defined by the interior surface of the storage tray 100, including an interior surface 102a of the 102 an interior surface 102a of the front wall 102, the interior surface 103a of the bottom wall 103, and the interior surface 104a of the rear wall 104. The attachment surface 105a of the attachment surface 105 of the first exemplary storage tray 100 is formed along a substantially horizontally oriented plane.

FIG. 4 presents an isometric view of the storage tray 100 attached to the monitor 300. The monitor 300 can be any commercially available monitor 300, wherein the monitor includes a display 310 supported by an enclosure 312. The enclosure 312 includes a lower enclosure surface or monitor lower edge 314. The attachment surface 105a of the storage tray 100 is attached to the lower enclosure surface 314 of the monitor 300.

Figure 5:
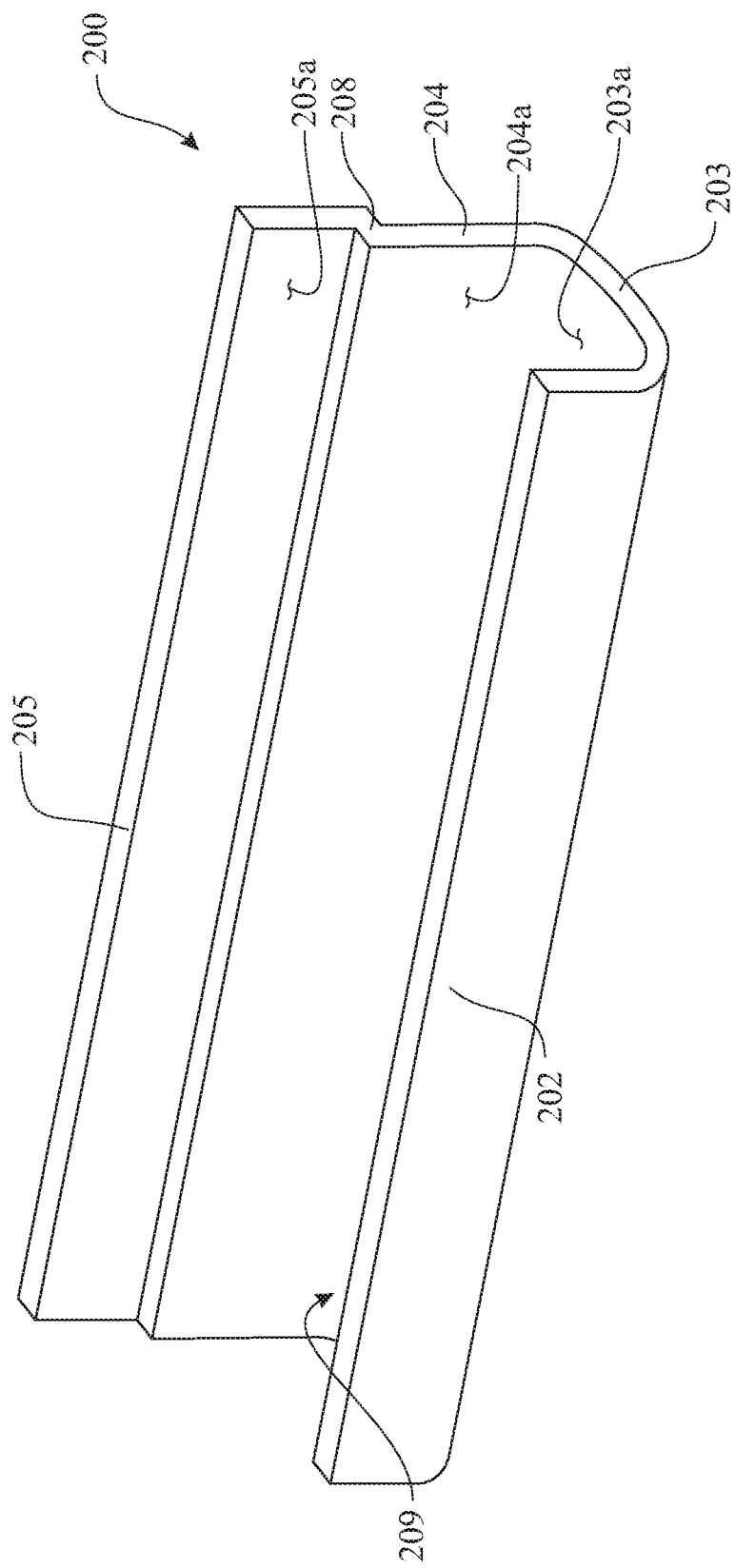
FIG. 5 presents a perspective view of another embodiment of a storage tray that secures to a monitor.

FIG. 5 presents a perspective view of another embodiment of a storage tray 200 that secures to a monitor 300 (FIG. 4). The storage tray 200 and the storage tray 100 include a number of like elements and like structure. Like elements of the storage tray 200 and the storage tray 100 are numbered the same, where the elements of the storage tray 200 are preceded by the numeral "2". This storage tray 200 includes a front wall 202, a bottom wall 203, a rear wall 204, and an attachment wall 205 having an attachment surface 205a that secures to a rear 320 (FIG. 4) of the monitor 300. The attachment wall 205 extends substantially parallel to the rear wall 204 in an upward direction. The attachment wall 205 can be offset from the rear wall 204 by an attachment wall offset member 208. In the exemplary illustration, the attachment wall 205 is offset from the rear wall 204 by an attachment wall offset member 208, where the attachment wall offset member 208 extends rearward from an upper, free end of the rear wall 204 and the attachment wall 205 extends upward from the opposite end of the attachment wall offset member 208.

Figure 6:
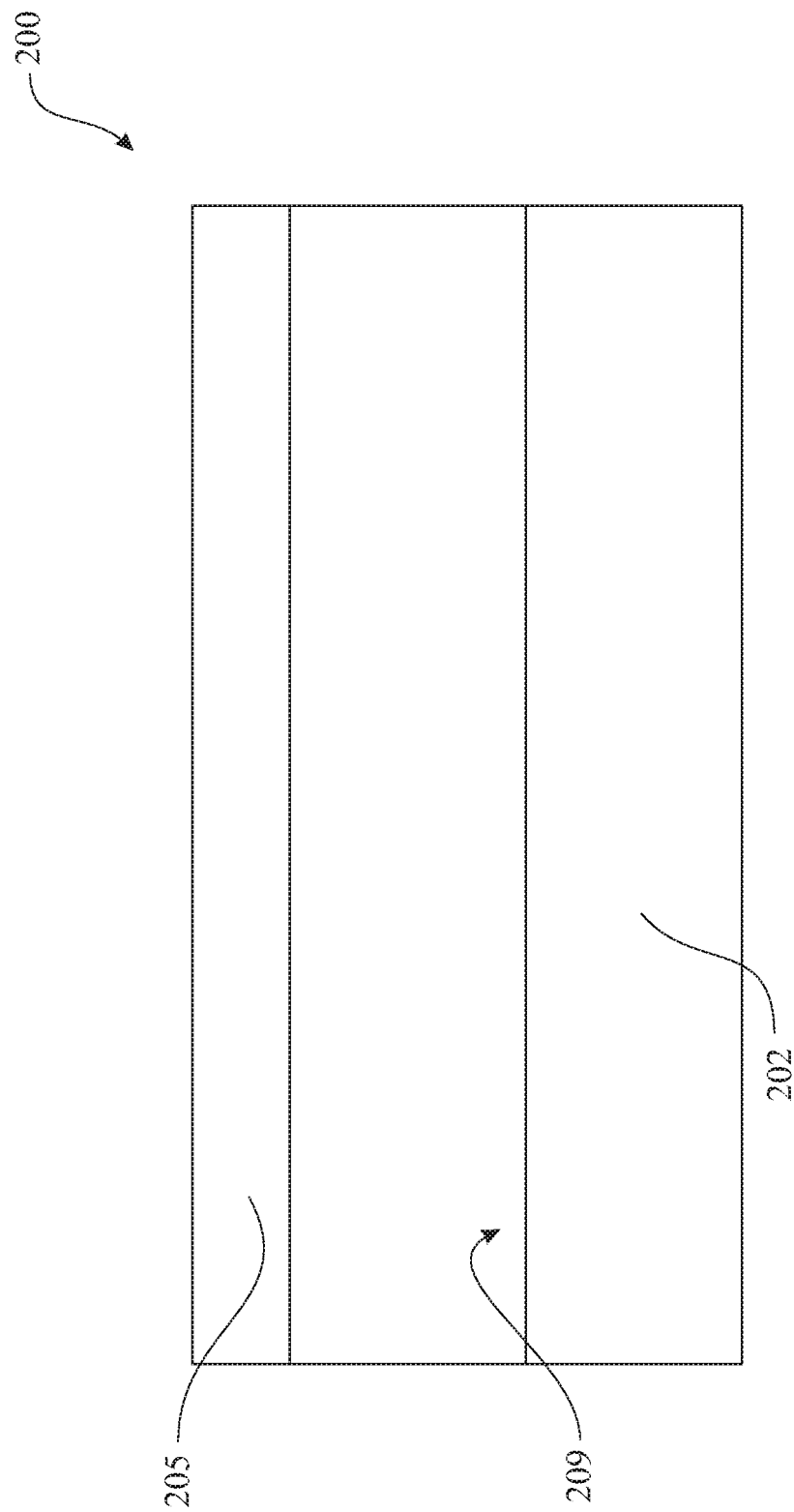
FIG. 6 presents a front view of the storage tray originally introduced in FIG. 1.

FIG. 6 presents a front view of the storage tray 200 originally introduced in FIG. 1; the illustration showing a storage tray 200 that secures to the monitor 300. The exemplary illustration shows the front wall 202, the storage compartment 209, and the attachment surface 205a of the of the attachment wall 205. The distinction between the attachment wall 205 of the second exemplary storage tray 200 and the attachment wall 105 of the first exemplary storage tray 100 is that the attachment wall 205 of the second exemplary storage tray 200 is vertically oriented, whereas the attachment wall 105 of the first exemplary storage tray 100 is horizontally oriented. The attachment wall 205 extends substantially parallel to a free end of the rear wall 204.

Figure 7:
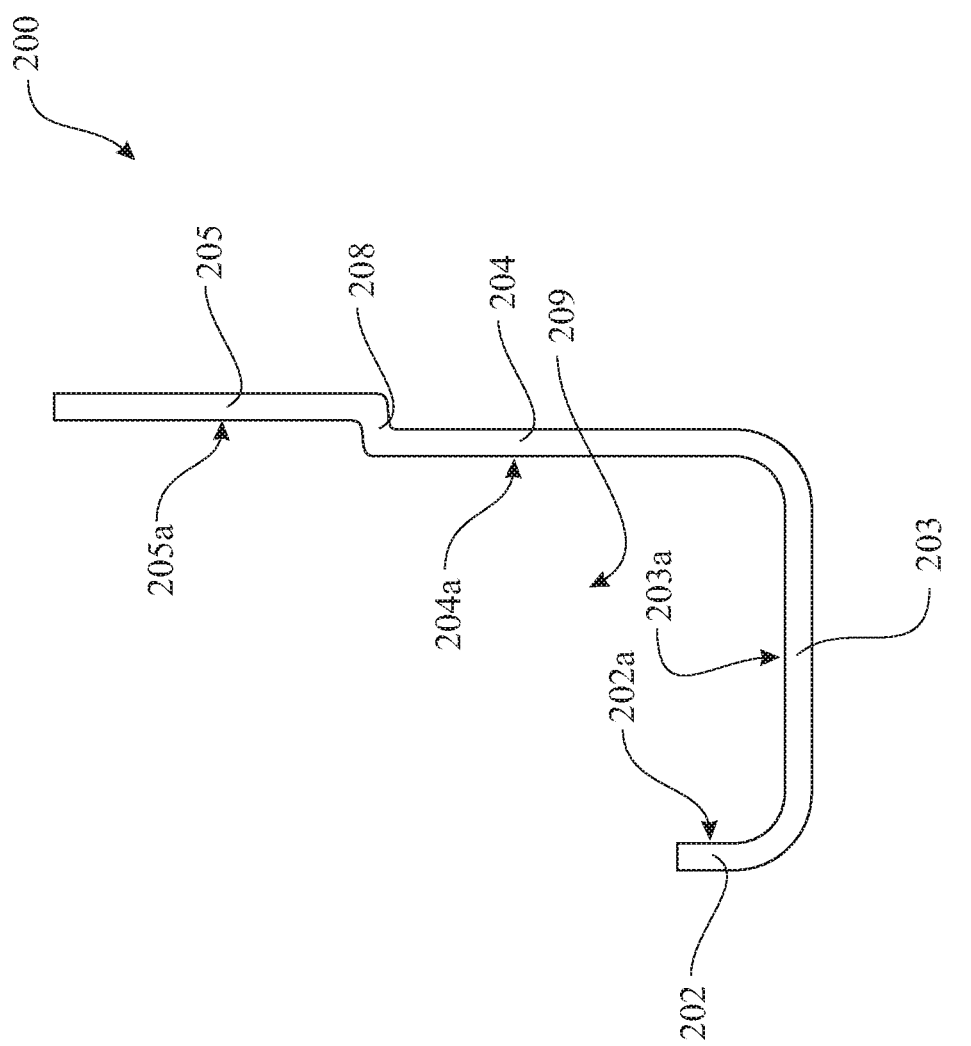
FIG. 7 presents a side edge view of the storage tray originally introduced in FIG. 1.

FIG. 7 presents a side edge view of the storage tray 200 originally introduced in FIG. 5; the illustration showing the front wall 202, the bottom wall 203, the rear wall 204, and the attachment wall 205 front wall 202 and the attachment wall 205. The illustration best presents the storage compartment 209. The storage compartment 209 is defined by the interior surface of the storage tray 200, including an interior surface 202a of the front wall 202, the interior surface 203a of the bottom wall 203, and the interior surface 204a of the rear wall 204. The attachment surface 205a of the attachment surface 205 of the second exemplary storage tray 200 is formed along a substantially vertically oriented plane.

Figure 8:
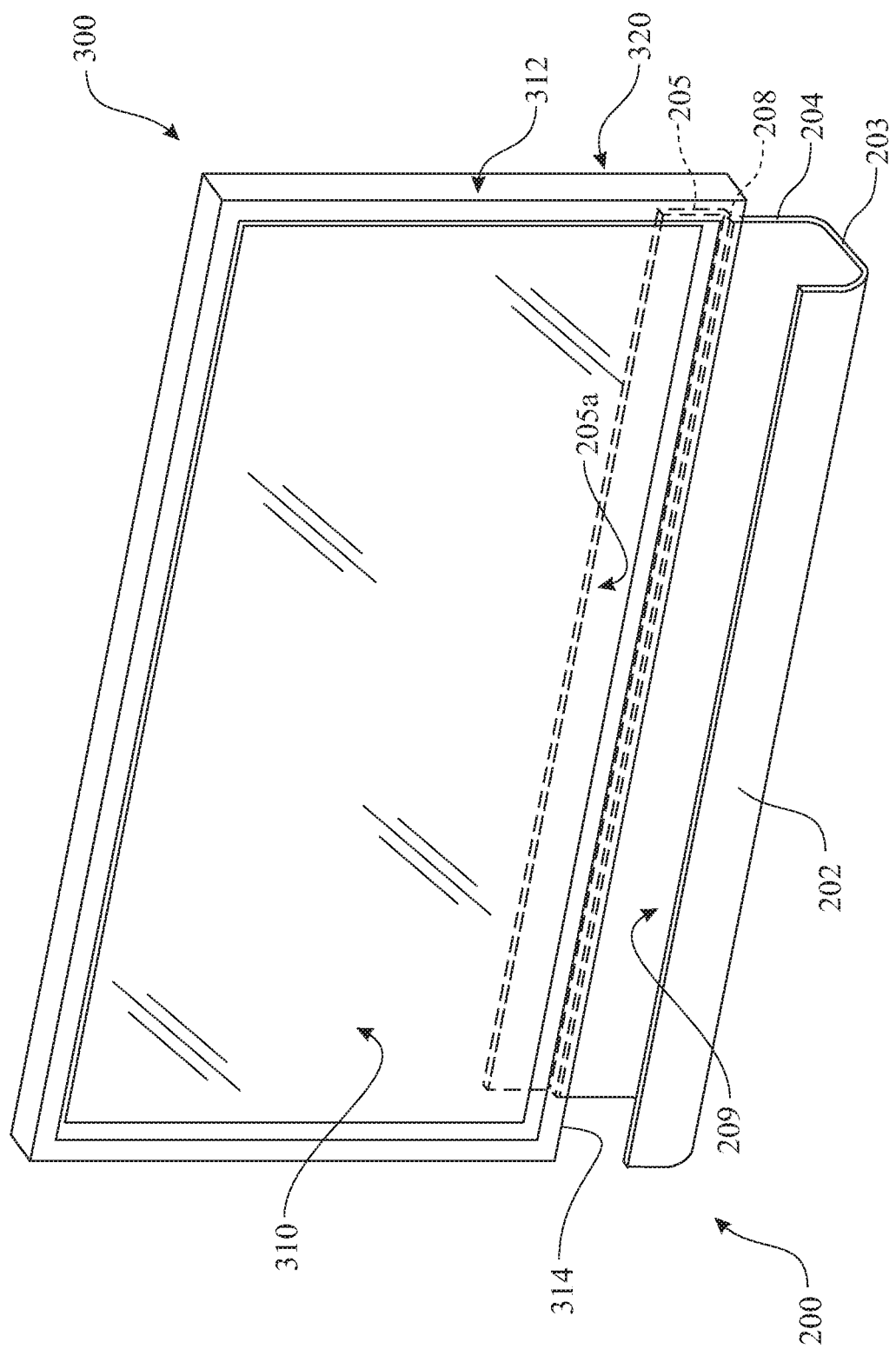
FIG. 8 presents an isometric view of the storage tray originally introduced in FIG. 1, wherein the storage tray is secured to a computer monitor.

FIG. 8 presents an isometric view of the storage tray 200 attached to the monitor 300. The enclosure 312 includes a lower enclosure surface or monitor lower edge 314 and a lower region of a rear surface. The attachment surface 205a of the storage tray 200 is attached to the lower region of the rear 320 of the monitor 300.

Figure 9:
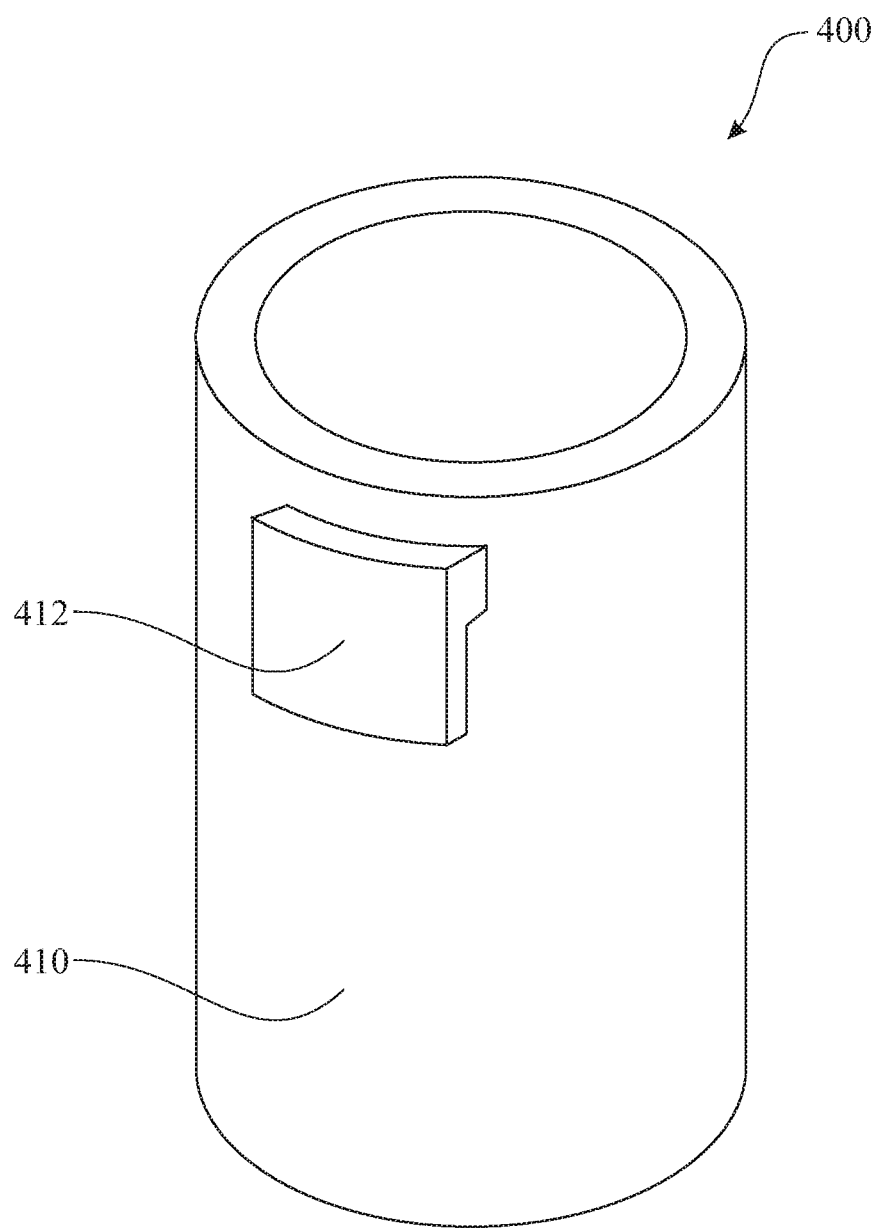
FIG. 9 presents a front isometric view of a storage container that attaches to the storage trays of FIGS. 1-7.

FIG. 9 presents an exemplary storage container 400 that attaches to the storage tray 100, 200 of FIGS. 1-7. The storage container 400 includes a storage cup 410 and an attachment clip 412. The storage cup 410 can take any suitable shape. Likewise, the attachment clip 412 is intended to slidably attach to the front wall 102, 202 of the storage tray 100, 200, such that it can be easily positioned by the user.

As can be seen, the invention provides multiple ways in which items can be conveniently stored until needed.

While specific embodiments have been discussed to illustrate the invention, it will be understood by those skilled in the art that variations in the embodiments can be made without departing from the spirit of the invention. The types of materials used can vary, the method of attachment can vary, etc. Therefore, the invention shall be limited solely to the scope of the claims.

The invention claimed is:

1. A storage tray comprising:
   a front wall having an elongated and generally linear shape;
   a bottom wall having an elongated and generally linear shape;
   a rear wall having an elongated and generally linear shape; and
   an attachment wall, the attachment wall extending in one of:
   a) horizontally, being carried by an upper edge of the rear wall, or
   b) vertically, being carried by an upper edge of the rear wall,
   wherein the front wall and the bottom wall are contiguous with and transition between one another, and the rear wall and the bottom wall are contiguous with and transition between one another,
   wherein an interior surface of the front wall, an interior surface of the bottom wall, and an interior surface of the rear wall collectively define a storage compartment;
   wherein the storage tray is secured to one of (a) lower edge of a computer monitor or (b) a lower region of a rear of the computer monitor by adhering an attachment surface of the attachment wall to the one of (a) the lower edge of the computer monitor or (b) the lower region of the rear surface of the computer monitor.

2. The storage tray as recited in claim 1, wherein a height of the front wall is smaller than a height of the rear wall.

3. The storage tray as recited in claim 1, wherein the front wall, the bottom wall, and the rear wall collectively form a U shape.

4. The storage tray as recited in claim 1, wherein the attachment wall extends horizontally and the attachment surface of the attachment wall is secured to the lower edge of the computer monitor.

5. The storage tray as recited in claim 1, wherein the attachment wall extends horizontally and forward from a free upper edge of the rear wall,
   wherein the attachment surface of the attachment wall is secured to the lower edge of the computer monitor.

6. The storage tray as recited in claim 1, wherein the attachment wall extends vertically and the attachment surface of the attachment wall is secured to the lower region of the rear surface of the computer monitor.

7. The storage tray as recited in claim 1, further comprising an attachment wall offset member wherein the attachment wall extends vertically,
   wherein a first edge of the attachment wall offset member is contiguous with the upper edge of the rear wall and a second edge of the attachment wall offset member being contiguous with a lower edge of the attachment wall,
   wherein the attachment surface of the attachment wall is secured to the lower region of the rear surface of the computer monitor.

8. The storage tray as recited in claim 1, further comprising an attachment wall offset member wherein the attachment wall extends vertically and is located rearward of the rear wall, a first edge of the attachment wall offset member being contiguous with the upper edge of the rear wall where the attachment wall offset member extends rearward from the rear wall and a second edge of the attachment wall offset member being contiguous with a lower edge of the attachment wall,
   wherein the attachment surface of the attachment wall is secured to the lower region of the rear surface of the computer monitor.

9. The storage tray as recited in claim 1, further comprising a storage container, wherein the storage container includes:
   a storage cup; and
   an attachment clip secured to the storage cup, wherein the storage clip slideably assembles the storage container to the storage tray.

10. A storage tray comprising:
a front wall having an elongated and generally linear shape;
a bottom wall having an elongated and generally linear shape;
a rear wall having an elongated and generally linear shape; and
an attachment wall, the attachment wall extending in one of:
a) horizontally, being carried by an upper edge of the rear wall, or
b) vertically, being carried by an upper edge of the rear wall,
wherein the front wall and the bottom wall are contiguous with and transition between one another, and the rear wall and the bottom wall are contiguous with and transition between one another,
wherein the front wall, the bottom wall, and the rear wall collectively form a U shape;
wherein an interior surface of the front wall, an interior surface of the bottom wall, and an interior surface of the rear wall collectively define a storage compartment;
wherein the storage tray is secured to one of (a) a lower edge of a computer monitor or (b) a lower region of a rear of the computer monitor by adhering an attachment surface of the attachment wall to the one of (a) the lower edge of the computer monitor or (b) the lower region of the rear surface of the computer monitor.

11. The storage tray as recited in claim 10, wherein a height of the front wall is smaller than a height of the rear wall.

12. The storage tray as recited in claim 10, wherein the attachment wall extends horizontally and the attachment surface of the attachment wall is secured to the lower edge of the computer monitor.

13. The storage tray as recited in claim 10, wherein the attachment wall extends horizontally and forward from a free upper edge of the rear wall,
wherein the attachment surface of the attachment wall is secured to the lower edge of the computer monitor.

14. The storage tray as recited in claim 10, wherein the attachment wall extends vertically and the attachment surface of the attachment wall is secured to the lower region of the rear surface of the computer monitor.

15. The storage tray as recited in claim 10, further comprising an attachment wall offset member wherein the attachment wall extends vertically,
wherein a first edge of the attachment wall offset member is contiguous with the upper edge of the rear wall and a second edge of the attachment wall offset member being contiguous with a lower edge of the attachment wall,
wherein the attachment surface of the attachment wall is secured to the lower region of the rear surface of the computer monitor.

16. The storage tray as recited in claim 10, further comprising an attachment wall offset member wherein the attachment wall extends vertically and is located rearward of the rear wall, a first edge of the attachment wall offset member being contiguous with the upper edge of the rear wall where the attachment wall offset member extends rearward from the rear wall and a second edge of the attachment wall offset member being contiguous with a lower edge of the attachment wall,
wherein the attachment surface of the attachment wall is secured to the lower region of the rear surface of the computer monitor.

17. The storage tray as recited in claim 10, further comprising a storage container, wherein the storage container includes:
a storage cup; and
an attachment clip secured to the storage cup,
wherein the storage clip slideably assembles the storage container to the storage tray.

* * * * *